United States Patent
Xu (10) Patent No.: US 7,304,403 B2
(45) Date of Patent: Dec. 4, 2007

(54) POWER SIGNALING BASED TECHNIQUE FOR DETECTING ISLANDING CONDITIONS IN ELECTRIC POWER DISTRIBUTION SYSTEMS

(75) Inventor: Wilsun Xu, Edmonton (CA)

(73) Assignee: Governors of the University of Alberta, Edmonton AB (CA)

( * ) Notice: Subject to any disclaimer, the term of this patent is extended or adjusted under 35 U.S.C. 154(b) by 254 days.

(21) Appl. No.: 11/116,211

(22) Filed: Apr. 28, 2005

(65) Prior Publication Data

US 2005/0275979 A1 Dec. 15, 2005

(30) Foreign Application Priority Data

Jun. 9, 2004 (CA) ................................ 2470536
Jul. 29, 2004 (CA) ................................ 2476030

(51) Int. Cl.
*H02J 1/00* (2006.01)
*H02J 3/00* (2006.01)
(52) U.S. Cl. .......................................... 307/84; 361/20
(58) Field of Classification Search .................. 307/84, 307/87; 702/57–60, 62, 64–65, 69, 115, 702/124, 125, 183; 361/20, 62, 21, 78, 64, 361/66, 68; 340/310.11, 310.15
See application file for complete search history.

(56) References Cited

U.S. PATENT DOCUMENTS

| | | | | |
|---|---|---|---|---|
| 3,710,188 A * | 1/1973 | Oyachi | ........................ | 361/64 |
| 4,106,007 A | 8/1978 | Johnston et al. | ............. | 340/310 |
| 4,218,655 A | 8/1980 | Johnston et al. | .............. | 455/39 |
| 4,340,880 A | 7/1982 | Baumann | ..................... | 340/310 |
| 4,658,238 A | 4/1987 | Mak | ............................ | 340/310 |
| 4,868,539 A | 9/1989 | Foord | .......................... | 340/310 |
| 5,686,766 A | 11/1997 | Tamechika | ................... | 307/43 |
| 5,808,449 A * | 9/1998 | Hirayama et al. | ............ | 322/20 |
| 6,172,889 B1 | 1/2001 | Eguchi et al. | ................ | 363/95 |
| 6,219,623 B1 | 4/2001 | Wills | .......................... | 702/60 |
| 6,429,546 B1 | 8/2002 | Ropp et al. | .................... | 307/31 |
| 6,603,290 B2 * | 8/2003 | Hochgraf | ..................... | 322/37 |
| 6,810,339 B2 | 10/2004 | Wills | .......................... | 702/65 |
| 6,815,932 B2 | 11/2004 | Wall | ........................... | 322/20 |
| 2003/0098671 A1 | 5/2003 | Hochgraf | | |
| 2003/0165936 A1 | 9/2003 | Rabbani | | |

(Continued)

OTHER PUBLICATIONS

P. O'Kane, B. Fox, "Loss of mains detection for embedded generation by system impedance monitoring" in *Developments in Power System Protection, Sixth International Conference on (Conf. Publ. No. 434)*, pp. 95-98, 1997.

(Continued)

*Primary Examiner*—Michael Sherry
*Assistant Examiner*—Carlos Amaya
(74) *Attorney, Agent, or Firm*—C. A. Rowley (57) ABSTRACT

A signaling system for detecting power line discontinuity in a power distribution system having a local power generator in a feeder line employs a signal generator that provides a local generator control signal with a preset protocol continuously and is located in the power distribution system upstream of said local power generator. A power detector terminates the local generator control signal and a signal detector in said feeder line detects the presence of the signal and triggers the shutdown of the local generator when the signal is not detected by the signal detector for a predefined period of time.

20 Claims, 10 Drawing Sheets

U.S. PATENT DOCUMENTS

2004/0021470 A1    2/2004    Adams et al.

OTHER PUBLICATIONS

M. E. Ropp, M. Begovic, A. Rohatgi, "Prevention of islanding in grid-connected photovoltaic systems", in *Progress in Photovoltaics: Research and Applications*, v 7, n 1, pp. 39-59, 1999.

L. Asiminoaei, R. Teodorescu, F. Blaabjerg and U. Borup, "A new method of on-line grid impedance estimation for PV inverter", in *Applied Power Electronics Conference and Exposition, APEC '04, Nineteenth Annual IEEE*, v3, pp. 1527-1533, 2004.

C. Jeraputra, P. N. Enjeti, "Development of a robust anti-islanding algorithm for utility interconnection of distributed fuel cell powered generation", in *Power Electronics, IEEE Transactions on*, v19, n 5, pp. 1163-1170, 2004.

Shyh-Jier Huang, Fu-Sheng Pai, "A new approach to islanding detection of dispersed generators with self-commutated static power converters", in *Power Delivery, IEEE Transactions on*, v15, n2, pp. 500-507, 2000.

H. Kobayashi, K. Takigawa, E. Hashimoto, A. Kitamura, H. Matsuda, "Method for preventing islanding phenomenon on utility grid with a number of small scale PV systems", in *Photovoltaic Specialists Conference, 1991, Conference Record of the Twenty Second IEEE*, v1, pp. 695-700, 1991.

G. A. Smith, P. A. Onions, D. G. Infield, "Predicting islanding operation of grid connected PV inverters" in *Electric Power Applications, IEE Proceedings*, v147, n1, pp. 1-6, 2000.

Guo-Kiang Hung, Chih-Chang Chang, Chern-Lin Chen, "Automatic phase-shift method for islanding detection of grid-connected photovoltaic inverters", in *Energy Conversion, IEEE Transactions on*, v18, n1, pp. 169-173, 2003.

O. Tsukamoto, K. Yamagishi, "Detection of islanding of multiple dispersed photovoltaic power systems", in *Solar Energy*, v58, n1-3, pp. 9-15, 1996.

C. Bendel, D. Nestle, M. Viotto, "Safety aspects of decentralized net-coupled electrical generators", at kassel.de/pls/w3isetdad/www_iset_page.show_menu?p_lang=ger &p_owa_cal1=www_veroeff. show_veroeffdaten%3Fp_veroeff_nr=102%26p_lang=ger.

* cited by examiner

POWER SIGNALING BASED TECHNIQUE FOR DETECTING ISLANDING CONDITIONS IN ELECTRIC POWER DISTRIBUTION SYSTEMS

FIELD OF INVENTION

The present invention relates an improved system for detecting islanding conditions in electric power distribution systems, more particularly the present invention introduces voltage and/or current signals into a power distribution systems and detects islanding conditions based on the presence of the signals.

BACKGROUND OF THE PRESENT INVENTION

Distributed generation (DG) refers to the scheme of generating power by a large number of small generators connected at the power distribution system. Most distributed generators hereinafter referred to as Local Generators (LG) use renewable resources such as wind, solar and small hydro for power generation. DG has recently gained a lot of momentum in the power industry due to market deregulation. One of the problems faced by DG industry is to make sure that the LGs work in a safe environment and they can disconnect from the grid if any portion of the power distribution system where the LGs are connected becomes isolated from the main power supply due to, for example, faults. The objective is to protect the LGs and neighboring customers from electrical damage because most LGs cannot regulate voltage and frequency by themselves when operating in an electrical island. The current industry practice is to disconnect all LGs immediately after the occurrence of islands. Typically, a LG should be disconnected within 300 ms to 1 second after loss of main supply (MS) e.g. supply from the main generator (MG) according to prevalent DG interconnection standards. To achieve such a goal, each LG must be equipped with an islanding detection device. The common devices used for this purpose are modified versions of under/over voltage and under/over frequency relays. Representative examples of such relays are the Rate of Change of Frequency Relay (ROCOF) and the Vector Surge Relay (VSR), which is also known as vector shift or voltage jump relay. Another example is U.S. Pat. No. 6,815,932 which presents an improved implementation of the frequency-based islanding detection concept. It is known if the generation and load have a large mismatch in a power system, the frequency of the system will change. In view of the fact that the frequency is constant when the feeder is connected to the distribution system i.e. the MG, it is possible to detect the islanding condition by checking the amount and rate of frequency change. The ROCOF and VSR relays are based on such principles. This is the simplest islanding detection technique. However, it cannot function properly or fast enough if the generation and load mismatch is small. They often result in nuisance trips of LGs as well.

In order to overcome the above problem, active schemes that require a LG to inject small signals (or disturbances) to the system have been proposed. For example, U.S. Pat. No. 5,686,766 proposes to connect a switchable resistor at the LG terminal to disturb the total power output of the LG-resistor set. The degree of resultant power fluctuation is used to detect islanding conditions. U.S. Patent Application No. 2003/0098671 A1 proposes to inject voltage or current signals that will be used to determine the impedance of the system connected to the LG. U.S. Patent Application No. 2003/0165036A1 lets the LG inject white noise to the supply system for islanding detection. U.S. Pat. Nos. 6,219,623B1, 6,810,339B2, 6,172,899B1 proposes to shift the frequency or voltage of the LG as a disturbance. The shift is controlled in such a way as to result in a positive feedback to the frequency, which will make it easier to detect islanding conditions using frequency-based concepts. All of the above active methods suffer one common drawback, which is the interaction among the signals injected by different LGs. The interactions will degrade the quality of the signals, leading to less reliable detection of islanding conditions. Another problem faced by these methods is that some of the schemes, such as the positive feedback schemes, can only be implemented on inverter-based local generators.

In addition to the above local information based islanding detection schemes, techniques that use telecommunication means to trip islanded LGs have been used in industry. With this 'transfer-trip' scheme, each LG is equipped with a cellular phone like receiver. The isolating breakers each has a transmitter that sends a trip signal to the LG receivers if it opens. With current telecomm technologies, there is no major technical problem to do so. The problem is the cost and complexity. Firstly, it is expensive for areas that are not covered by radio communications. Secondly each breaker needs a transmitter and there could be several of them between the LG and the substation or MS. Thirdly, some of breakers need to be reconfigured and equipped with the capability of interfacing with the signal transmitter.

Fourthly, feeder segments including their LGs could be reconnected to a different system due to the practice of feeder reconfiguration. In this case, An LG signal receiver must have the capability to decide which signal transmitters it should listen to.

In summary, as more and more distributed generators are added to utility systems, it is highly desirable to have a reliable and low cost islanding detection technique. This is especially true for the synchronous machine based local generators.

U.S. Pat. Nos. 4,340,880 and 4,658,238 disclose a method of transmitting intelligence signals over the power transmission lines by adding at intervals a signal wave form to a carrier wave form to produce a composite wave form and the added signal wave form and on the carrier wave form and the intervals there between are detected and used to aid in deciphering the information being transmitted

BRIEF DESCRIPTION OF THE PRESENT INVENTION

It is an object of the present invention is to provide a new method and apparatus for islanding detection that utilizes power line as a signal carrier.

Broadly the present invention relates to a signaling system for detecting power line discontinuity in a power distribution system having a main source of power, power lines and at least one feeder line, a local power generator in said feeder line, a signal generator in said power distribution system upstream of said local power generator relative to said main source of power, said signal generator providing a local generator control signal with a preset protocol continuously, power detector means for terminating said application of said local generator control signal by said signal generator, a signal detector in said feeder line to detect said local generator control signal, said signal detector determining the presence of said signal and said signal detector including means to trigger the shutdown of said local generator when said signal is not detected by said signal detector for a predefined period of time.

Preferably said local generator control signal is a defined signal and said signal detector determine if a detected signal it receives is said predefined signal and said signal detector triggers shut down of said local generator if said signal detector determines said detected signal is not said defined signal for said predefined period of time Preferably said local generator control signal is a voltage signal and said signal generator applies said voltage signal through said power distributions system downstream of said signal generator relative to said main source of power.

Preferably power detector means for terminating said application of said local generator control signal comprises a current detector to detect current in said power distribution system immediately upstream of said signal generator and to terminate operation of said signal generator to provide said local generator control signal when said current detector detects a significant change in current.

Preferably said signal generator is positioned in said power distribution system immediately upstream of said local generator and generates a current signal that provides a continuous signal pattern that is detected by said signal detector and said signal detector is a current signal detector.

Preferably said signal generator is connect to a main supply line of said power supply system and said power detector means uses a significant drop in voltage to terminate operation of said signal generator.

Preferably said signal generator comprises a thyristor module composed of thyristor means to create a short circuit and thereby a change in current, a current detector to detect said change in current, a gating controller to control said thyristor module, said gating controller controlling said thyristor module and said current detector controlling said gating controller based on whether or not said current detector detects said change in current and said current detector functions as said power detector means for terminating said generation of said local generator control signal by said signal generator.

BRIEF DESCRIPTION OF THE SEVERAL VIEWS OF THE DRAWINGS (NEED REVISION)

Further features, objects and advantages will be evident from the following detailed description of the preferred embodiments of the present invention taken in conjunction with the accompanying drawings in which.

DETAILED DESCRIPTION OF THE INVENTION

Figure 1:
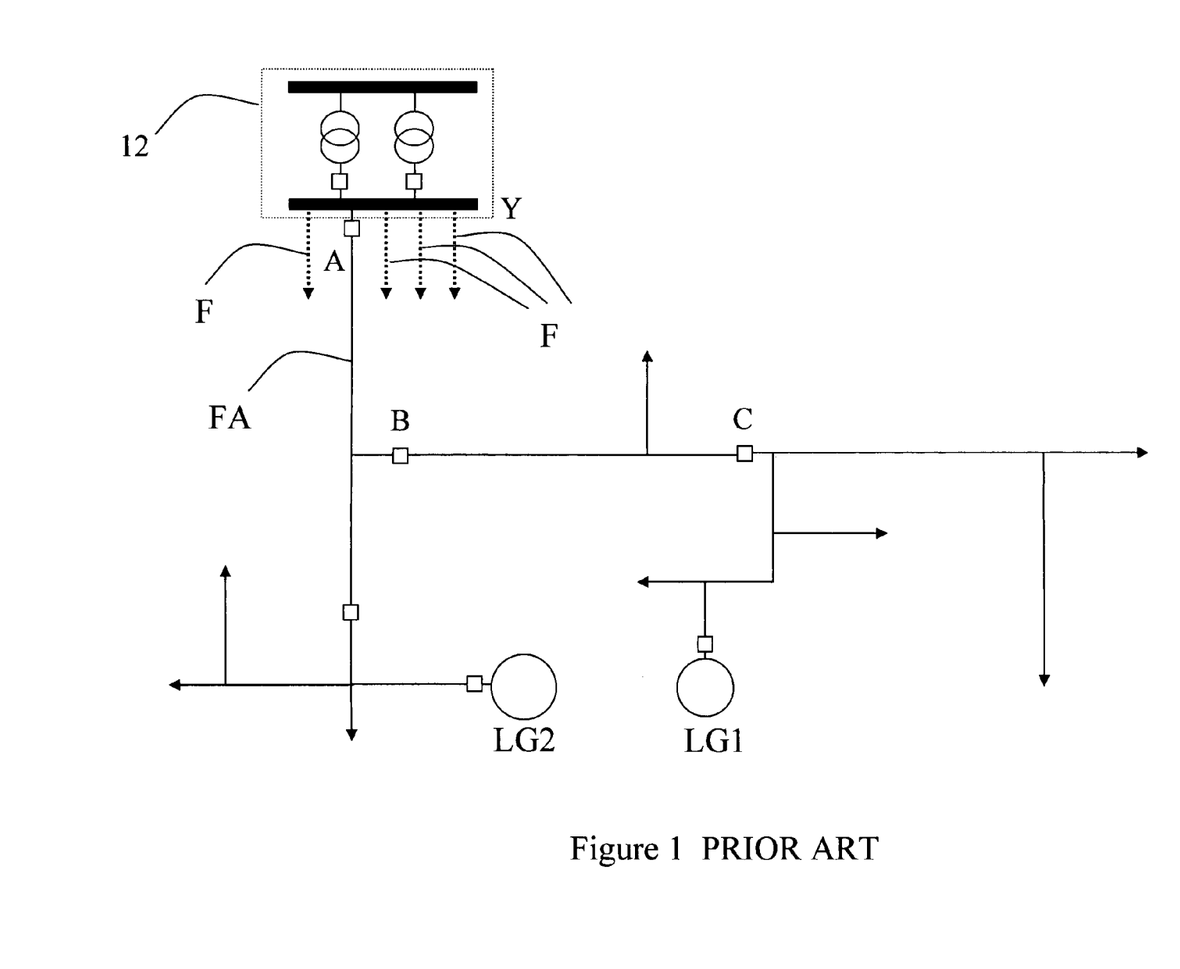
FIG. 1 is a schematic illustration of a typical Distribution Generation (DG) system as well known in the art.

FIG. 1 shows a typical power distribution system incorporating LGs. The main source of power to each feeder systems from the transmission system 10 which delivers power from the main generating site (not shown) to a substation 12 which in turn delivers power to the individual of feeder lines or circuits schematically represented by the lines F with the line designated FA showing added detail of the circuit. At least some of the feeder lines F as illustrated by feeder line FA which is a typical local circuit and includes at least one local generator which as above indicated will be referred to as a Local Generator (LG). During normal operation, the distribution system the LG(s) provide power into their respective feeder system F or FA. The total power from LG(s) is typically small in comparison with the total loads of the feeder but generally is significant in that it reduces the load requirement from the substation 12. If the feeder F or FA (or customer circuit) becomes isolated from the distribution system i.e. substation 12 and the main generating unit (MG) or main source of power (MS) due to, for example, the opening of breaker A, that isolated feeder becomes a small unregulated power system. The behavior of this unregulated system is unpredictable due to the power mismatch between the load and generation and the lack of controllers. This operating condition of LGs is called islanding. In other words, islanding occurs when a portion of the distribution system that includes an LG becomes electrically isolated from the remainder of the power system, yet continues to be energized by the LG(s). An important requirement for distributed generation (DG) is the capability to detect island conditions and trip the LG(s) in that islanded feeder accordingly. Failure to trip islanded generator(s) LG(s) can lead to a number of problems to the islanded generator(s) and the connected loads.

Figure 2:
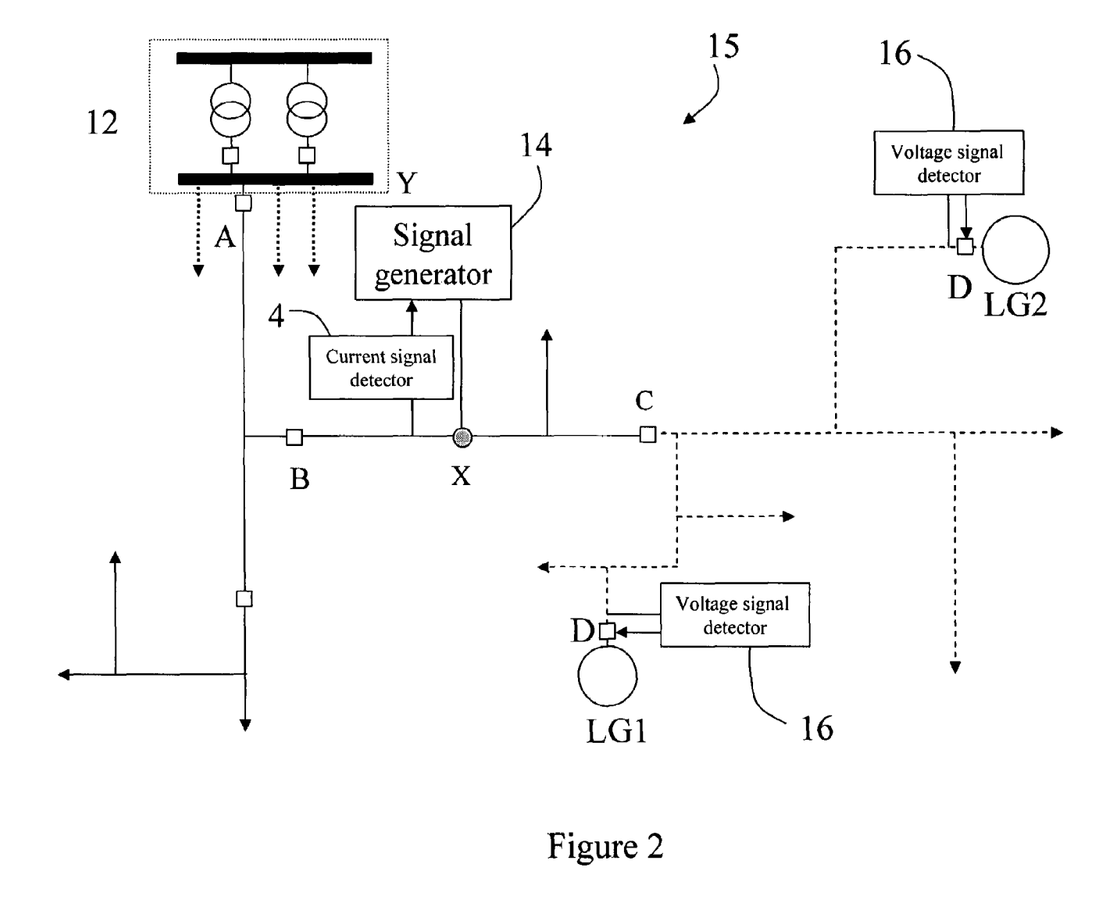
FIG. 2 is a similar system but modified to incorporate the present invention.

Turning now to FIG. 2 which illustrates an example of the present invention that includes two main devices: a signal generator (SG) 14 (shown in more detail in FIG. 6) connected at point X of the distribution system and a voltage signal detector 16 associated with a local generator LG (it will be noted that normally each LG will have its own voltage signal detector 16). The signal generator 14 generates a voltage signal which provides a local generator control signal and broadcasts this signal to all distribution feeders downstream of its connection point X with a preset protocol continuously. If the voltage signal detector 16 associated with a LG does not sense the voltage signal (caused, for example, by the opening of breaker C located downstream of the signal generator 14 and upstream of the voltage signal detector 16) for at least a selected minimum duration such as 200 milli-seconds (ms), it is considered as islanded from the signal generator location X and the signal detector 16 causes the local generator LG1 with which it is associated to be tripped immediately by tripping the relay D associated with the local generator being controlled. This is called the power line continuity checking feature of the invention.

Figure 7:
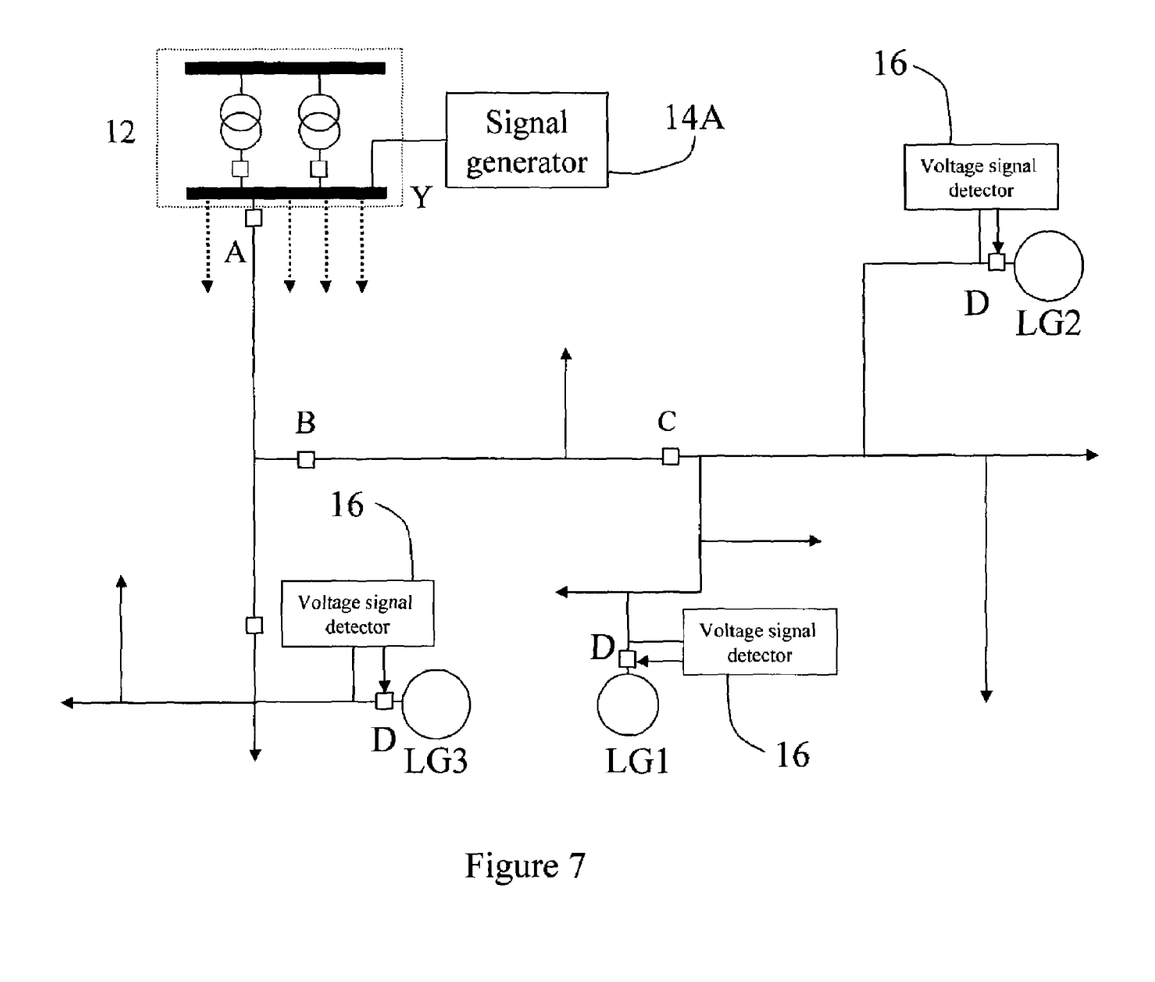
FIG. 7 is a schematic illustration of a signal generator positioned in the system at the substation.

Ideally, the signal generator should be connected to point Y that is the secondary bus of the power supply substation (see FIG. 7). This location will enable the signal generator to broadcast voltage signal to all feeders connected to the substation. However, due to regulatory, technical or economic constraints, this method of connecting the signal generator may not be feasible. That is why the signal generator 14 is normally positioned as shown in FIG. 2 at point X.

The second feature of the present invention is its use of a current signal (see FIGS. 2 and 6) the generator and detector of which normally forms a part of the signal generator functions as a power detector means to determine the power line continuity from the substation to the location of the signal generator 14. This is particularly important when the Signal generator 14 is located away from the substation 12 as shown in FIG. 2 as opposed to being located at the substation 12 as illustrated in FIG. 7. The signal generator 14 also draws current pulse from the power distribution system 15 upstream of the signal generator 14 which generates a current signal that is detected by the current signal detector 4 (see FIGS. 2 and 6) which is placed just upstream of the signal generator. If the supply substation 12 is disconnected (for example, due to the opening of breaker A or B), the current signal will become non-detectable since the signal generator 14 cannot draw sufficient current from the upstream system to boost the current signal level. This invention (as will be described in more detail here-in-below) therefore detects the current signal level to determine if the signal generator 14 is islanded from the upstream system. If it is islanded (as determined by the current signal detector 4), the signal generator 14 will shutdown, stopping broadcasting voltage signals to feeders downstream of point X. This will cause all voltage signal detectors 16 in the feeders downstream of point X to fail to detect the voltage signals and trigger their respective relay D and shut down their respective local generator LG. This feature is called scalability of the invention.

Because of scalability, the signal generator can be connected at any location of the system, protection a different portion of downstream systems. A significant advantage of the scalability feature is that the present invention, which can be classified an active scheme, will not encounter interaction problems suffered by other active schemes. This is because all LGs in a feeder can share one signal generator 14 that is placed in a location that is upstream of all LGs in that feeder. Since there is only one signal generator 14, interaction will not happen.

Figure 8:
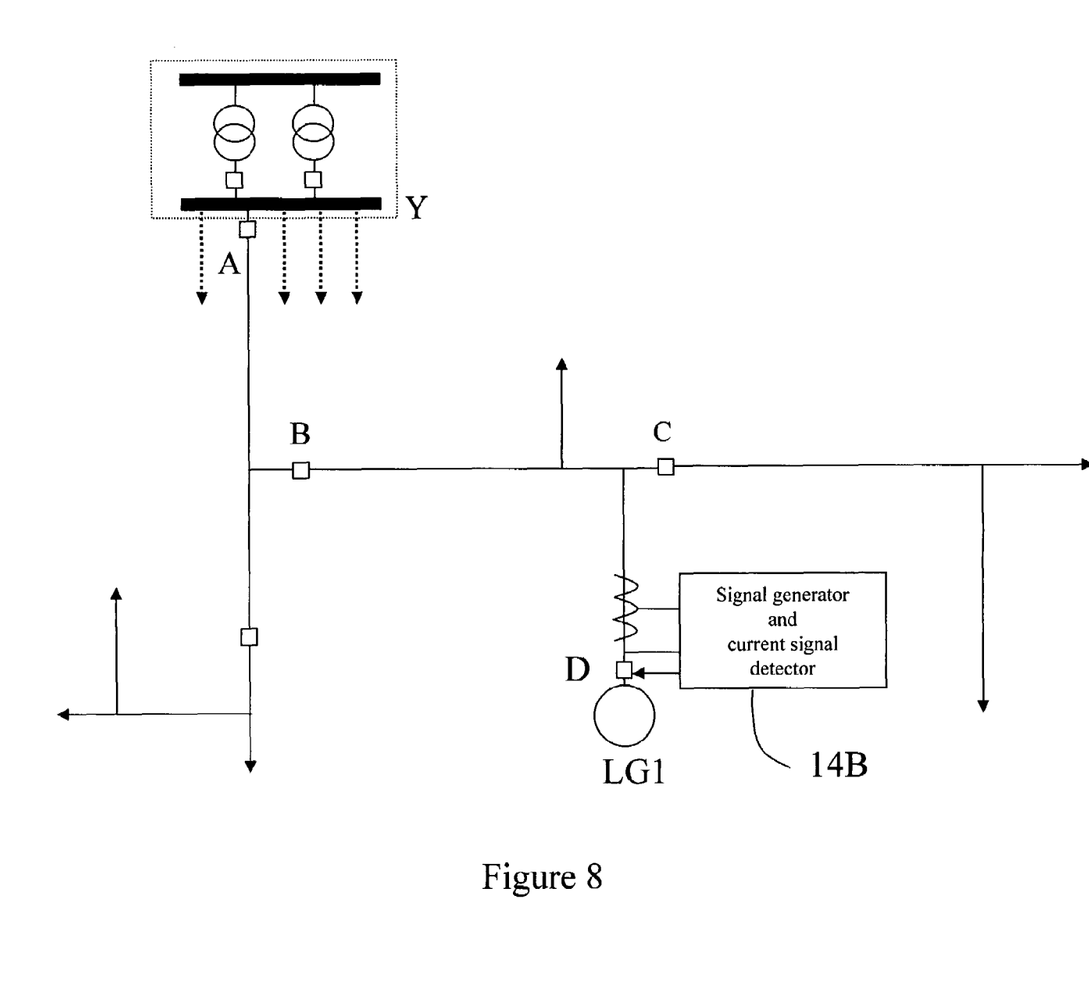
FIG. 8 is a schematic illustration of a signal generator positioned in the system at the local generator LG

The present invention therefore combines the advantages of the transfer trip scheme and the local detection scheme. The power line (as generally indicated as part of by the power distribution system 15) is used as a communication media to transmit a signal to test the connectivity between signal generator 14 and the LGs in the feeder (such as feeder FA downstream of the signal generator 14. A signal detector 16 placed at each LG site determines if the signal is present. Furthermore, the scalability feature allows the placement of the signal generator 14 at any location of the system. If there is only one LG in the system, the signal generator can be placed at the LG site to equip that specific LG with anti-islanding capability (see FIG. 8).

When the anti-islanding detection is placed at the LG site the current signal detection feature only is required (although the normal signal generator 14 may be used if desired) and is used to provide the local generator control signal normally provided by the signal generator 14. This may be the preferable option. As more LGs are added, the signal generator 14 can be used and be located to cover more areas using its voltage signal broadcasting feature as described above. This will result in significant flexibilities for customizing the anti-islanding system to fit the needs of individual distribution systems and LG installation pattern.

Another important advantage is that the voltage signaling scheme can be tested without actually breaking up the distribution feeders. The main tests could be done by simply stopping the signal generator 14. The signal detectors 16 should detect zero signals in this case. When applied to individual LGs, the invention is also significantly better than existing methods. These benefits will become clear in the following description.

Some methods are available or possible to generate current and voltage signals in the way described above. For example, U.S. Pat. Nos. 4,106,007 and 4,868,539 propose to use interharmonic (or voltage ripples) to carry signal. U.S. Pat. Nos. 4,106,007 and 4,218,655 propose to couple a voltage in series with phase voltage or through the system neutral point as a way to introduce a signal. U.S. Pat. Nos. 4,340,880 and 4,658,238 propose to use a temporary short-circuit to modulate the voltage waveform and to achieve the goal of signal injection. A paper entitled "Distribution line carrier communications—an historical perspective" and published on IEEE Transactions on Power Delivery, vol. PWRD-2, no. 2, April 1987 provided a good summary one power line carrier based signaling techniques.

Figure 3:
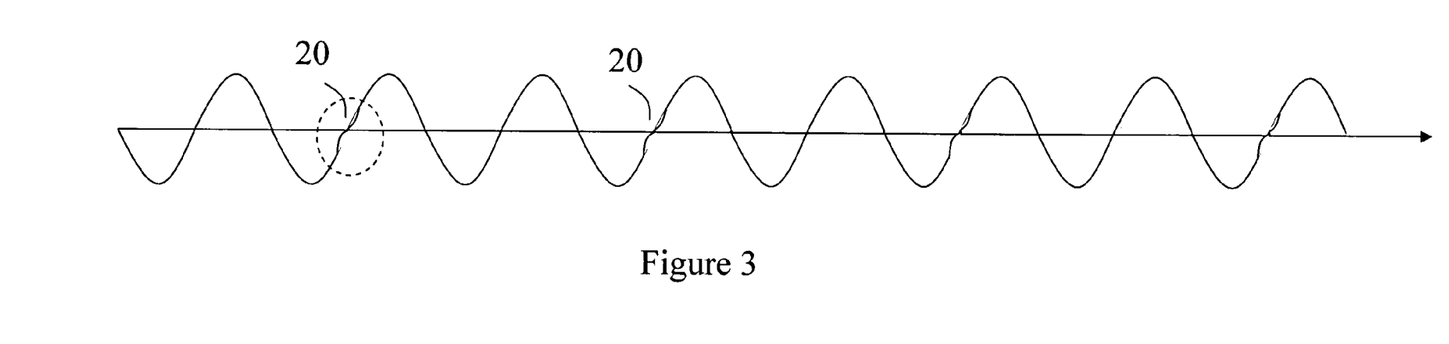
FIG. 3 shows a sample voltage waveform containing a voltage signal (signal pattern 010101010101).
Figure 4:
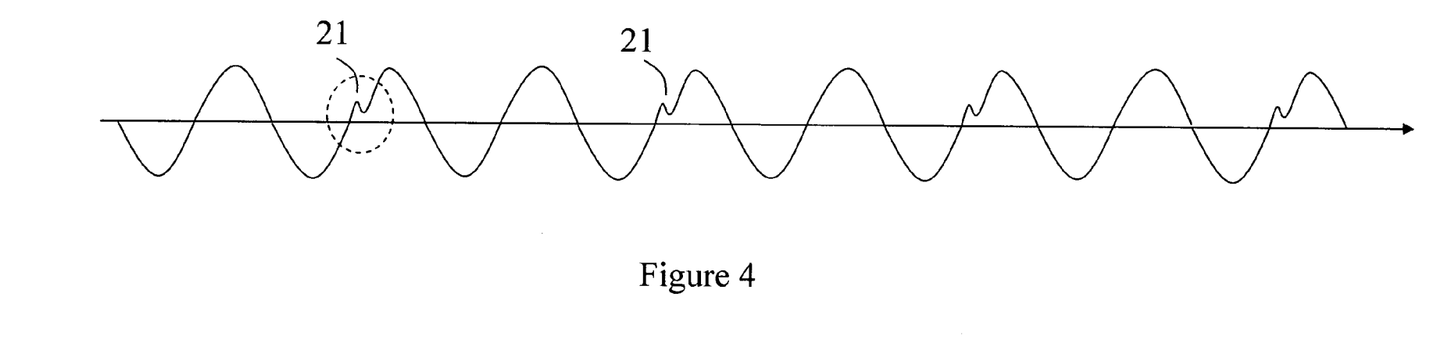
FIG. 4 shows a sample current waveform containing a current pulse (signal pattern 010101010101).

The present invention further includes a scheme to create the signals in a way that causes minimal disturbances to the normal operation of the system and yet can be detected with sufficient reliability by the signal generators. The scheme injects signals to the system 15 in selected cycles as shown in FIGS. 3 and 4. In these waveforms, every second cycle contains a small distortion 20 and/or 21 that is an indication of the existence of a signal. Depending on the requirement of response time and cost of signal generation, one can also let every third cycle or every fourth cycle contain the distortion 20 and/or 21.

Figure 5:
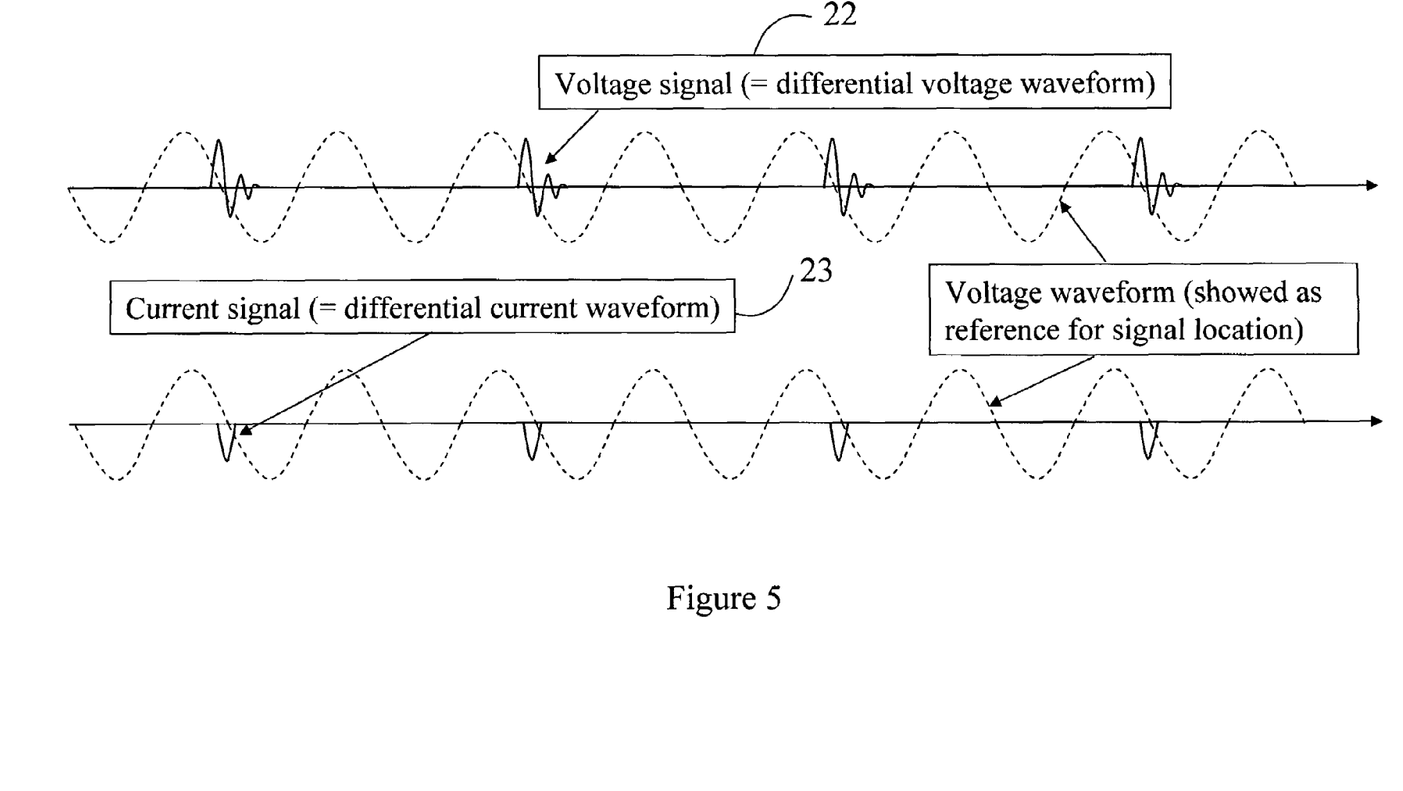
FIG. 5 shows the signal patterns the top wave form showing a voltage and the lower a current signal.

The signals are extracted by digitally subtracting two consecutive cycles of the measured waveform since they are present at most in one of the cycles (FIG. 5). This subtraction will eliminate background noise or waveform distortions. In theory, the signal is the only quantities left in the differential waveform as indicated at 22 and 23 in FIG. 5. The differential waveform is then used to determine the presence of the signal.

The voltage signals 20 can be injected on one or more of the three phase-to-ground voltages and/or one or more of the three phase-to-phase voltages, which if all are employed results in a total of 6 signal channels. The current signal (or pulse) 21 can be also drawn from one or more of the three phase-to-ground paths and/or one or more of the three phase-to-phase current paths.

This invention further specifies a preferred embodiment of the signal generator (SG) that can create the voltage and current signals that meet the specifications described above. Furthermore, both voltage and current signals can be created through the same mechanism, at the same time and using the same hardware, according to the embodiment.

Figure 6:
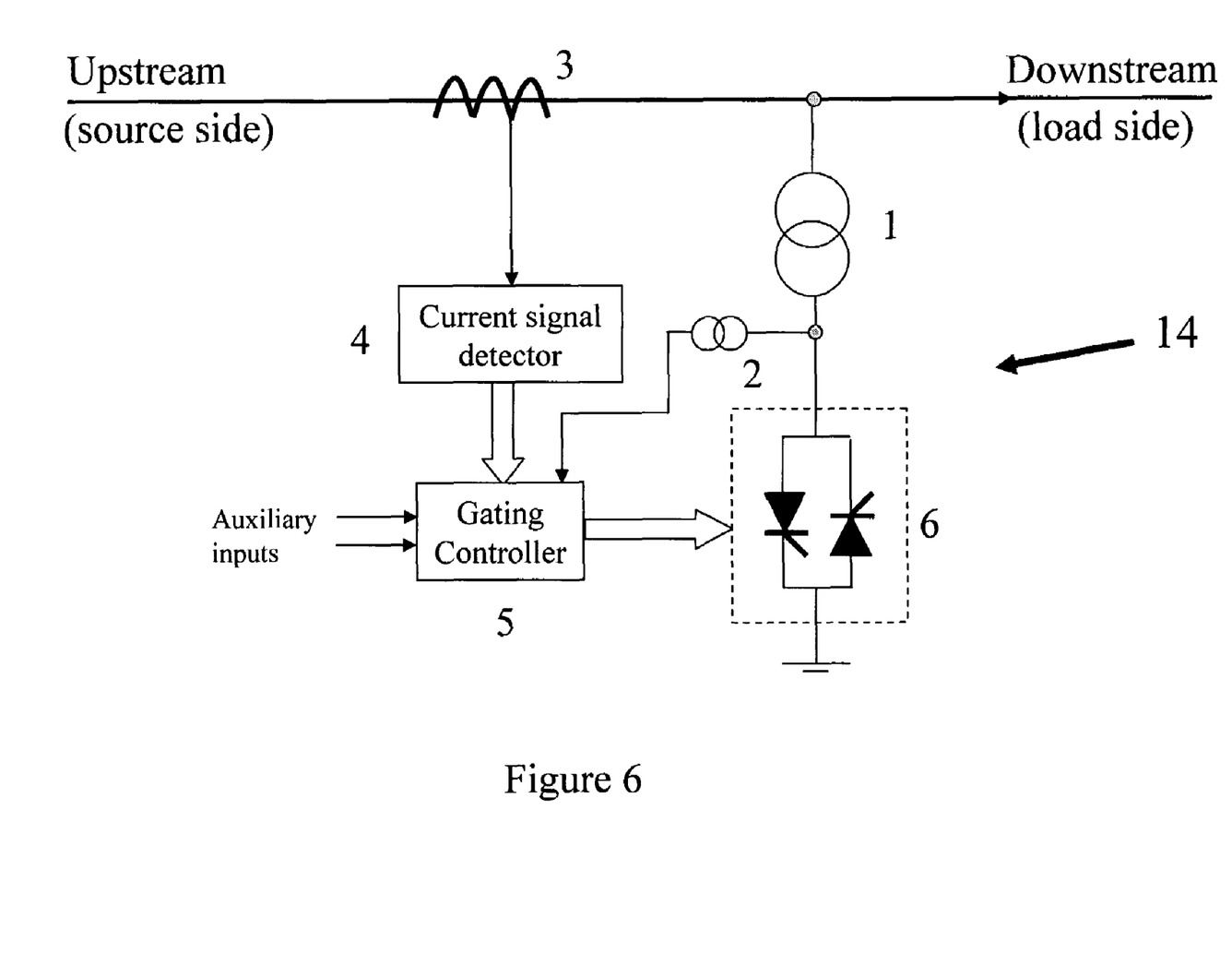
FIG. 6 is a schematic diagram of a preferred form of signal generator forming part of the present invention and showing a current detector combined therewith.

This embodiment is shown in FIG. 6. Both the voltage and current signals 20 and 21 are generated simultaneously by short-circuiting the voltage selected to carry the signal through a transformer impedance 1 and a thyristor 6. The thyristor 6 also draws a pulse current from the upstream system during the short-circuit process, which leads to the creation of a current signal. This embodiment also contains a built-in current signal detector 4 (show separated from the signal generator 14 but still part of the signal generator 14 in FIG. 2. If the current detector 4 detects no current signal, it will stop the grating controller 5 from triggering thyristor 6. Thus no voltage signal will be broadcast to downstream nodes.

In the preferred embodiment, the signal generator 14 includes the following components/features as numbered in the figure: Each element has been assigned its respective number 1 though 6 and these elements described below in numerical sequence.

1. Step-down transformer: In the preferred embodiment, a step-down transformer transforms the primary voltage (for example, 25 kV or 14.4 kV) to a reduced level (say 480V) for thyristor operation. The transformer also behaves as an impedance to limit the thyristor current and to reduce the amount of distortion introduced to the voltage. Common power transformers can be used. If the primary side voltage is already low or high voltage thyristors are used, this transformer may not be necessary and the amount of voltage distortion can be controlled by reducing the conduction angle of the thyristor. Obviously power at a voltage level that can be used by the gate or gating controller 5 must be available. The impedance of the transformer may be selected according to the following equations:

$$X_T = \frac{U_N^2(\sqrt{2}\sin\delta - k_s)}{3S_{PG}k_s}$$

where
$X_T$=Reactance of the signal transformer measured at the feeder primary side (Ohm)
$U_N$=Supply system rated line to line voltage (V)
$S_{PG}$=The supply system single phase to ground short circuit capacity (VA)
$\delta$=Thyristor firing angle ahead of the zero crossing point (typically 30°)

$$k_s = \frac{U_p}{U_{PG}}$$

Relative strength of the signal to be detected. Typical value is 3% to 5%.

The peak of the current pulse drawn can be estimated from the following equation:

$$I_{peak} = \frac{\sqrt{2/3}\, U_N}{X_T + X_{sys}}(1 - \cos\delta)$$

where $X_{sys}$ is the system impedance. If the SG is disconnected from the system, $X_{sys}$=infinity and $I_{peak}$ approaches zero. $I_{peak}$ is independent of the load current flowing on the distribution line.

2. Voltage transducer: In the preferred embodiment, voltage transducers are used to step down the voltage to level that can be used by the gate controller. The voltage provides reference information to time the thyristor gating operation. Common potential transformer (PT) can be used for this invention.

3. Current transducer: In the preferred embodiment, current transducers are used to step down or sense the line current upstream of the signal generator 14 and provide the input signal for the use by the current signal detector 4. It must be placed on the upstream side of the signal generator. Common current transformers (CT) can be used for this invention.

4. Current signal (pulse) detector: In the preferred embodiment, the detector is to detect the pulse current drawn from the upstream system. The presence of this pulse current indicates that the signal generator bus is still connected to the upstream system. How the pulse current is detected will be described later.

5. Thyristor gating controller: In the preferred embodiment, a controller may perform several functions. Firstly, it may establish the pattern of signaling, such as one signal injection for every 2 or 3 cycles, etc. Secondly, the controller may trigger the thyristor 6 to conduct at α degrees before the zero-crossing of the voltage waveform when signal injection is needed for that cycle. Thirdly, it may decide which channel to disable/enable signaling if multi-channel is available. Fourthly, the controller takes the information provided by the current signal detector. If the detector indicates there is no current signal, the control will stop firing the thyristor. Fifthly, the controller is preferably equipped with auxiliary inputs and is preferably configured such that one of the inputs can disable the triggering operation. When this happens, the signal generator will stop signaling. The first and second functions will be used in most if not all systems and the third forth and fifth functions may be provides as desired or required for and specific installation.

6. Thyristor module: In the preferred embodiment, the thyristor module behaves as a switch to short-circuit the transformer secondary momentarily. The short circuit introduces a voltage dip to primary voltage. This voltage dip is the distortion needed to represent the presence of a signal. The current drawn by the thyristor is a pulse current, which is drawn from the upstream system (as above indicated it is this change in current that is detected by the current detector 4. If such a current exists, it indicates that the SG is still connected to the supply system. The thyristor module is preferably equipped with two thyristors connected in anti-parallel arrangement. Two thyristors are needed to produce a signal in either polarity. The signal polarity is useful to add further flexibility to create signal pattern or to avoid the production of excessive direct current DC (when the SG is not connected to the substation). For the later case, the signal is created with alternate polarities.

In the preferred embodiments of the present invention, there are three different arrangements for the placement of the signal generators: 14

1. Connect the signal generator 14 to the substation secondary bus as shown in FIG. 7: With this arrangement, the voltage signal will be broadcast to all feeders connected to the bus. There is no need to detect the current pulse since the check for connection to the 'upstream' is no longer necessary. For this reason the signal generator used at the bus y may be different from the detector used at position (X see FIG. 2) and for this reason the signal generator at eh bus Y has been indicated as 14A. The parts 3 and 4 thus may be omitted from the signal generator 14A. The advantage of this arrangement is that one signal generator 14A covers the needs of all LGs. This scheme will provide anti-islanding protection for all LGs supplied from the substation.

2. Connect the signal generator to any point of a distribution feeder, an example of which is shown in FIG. 2: With this arrangement the signal generator 14 which is the signal generator 14 as described above with reference to FIG. 6 will be used and the voltage signal (local generator control signal) will, as above described with reference to FIG. 2, be broadcast to all nodes downstream of the connection point X. The current pulse must be checked to determine if the SG 14 is connected to the upstream system. If the current pulse disappears, the SG 14 should stop broadcasting. A typical application of this arrangement is to connect the SG to the sending end of a feeder, just outside of the substation fence. The advantage of this arrangement is that one does not need to access to the substation and therefore cost can be reduced. This scheme will provide anti-islanding protection for all LGs downstream of the signal generator location X.

3. Connect the signal generator 14B to the bus having a distributed generator shown in FIG. 8: This arrangement combines the signal generator 14 and the signal detector 16 into a single unit and uses the current pulse drawing capability of the SG to determine if the site is connected to the supply system. Broadcast of the voltage signal is not necessary since there is no LG in downstream This is an opposite of the first arrangement. The CT must be placed on the upstream side of the SG. The current signal detector will be used to directly trigger the opening of breaker D. The advantage of this arrangement is that one only needs to deal with one LG and the responsibility of paying the cost of anti-islanding protection can be clearly determined. This scheme will provide anti-islanding protection for only one LG that has the signal generator and detector on site.

In applications where a current detector 4 is required the current signal detector 4 detects whether or not the line is powered and functions as in effect a power detector means however where the current detector is not required i.e. the FIG. 7 embodiment the signal generator has not sufficient power available to generate and send a signal and thus proves in effect a power detector means.

This invention further specifies the preferred embodiment of the signal detector (SD). In the preferred embodiment of the present invention, the voltage signal detector is installed at the location in the distribution system where a local generator LG is connected. A current signal detector is at the SG site and is expected to be a component of the SG equipment. Both the voltage and current signal detectors work in a similar way. The detectors sense the three phase voltages or currents at their respective locations. If the signal (voltage or current depending on the detector) is not present or the signal pattern is not consistent with the pre-established rule and the signal detector will send a signal trip the distributed generator. In the case of current signal detector, it will disable the signal generator.

Figure 9:
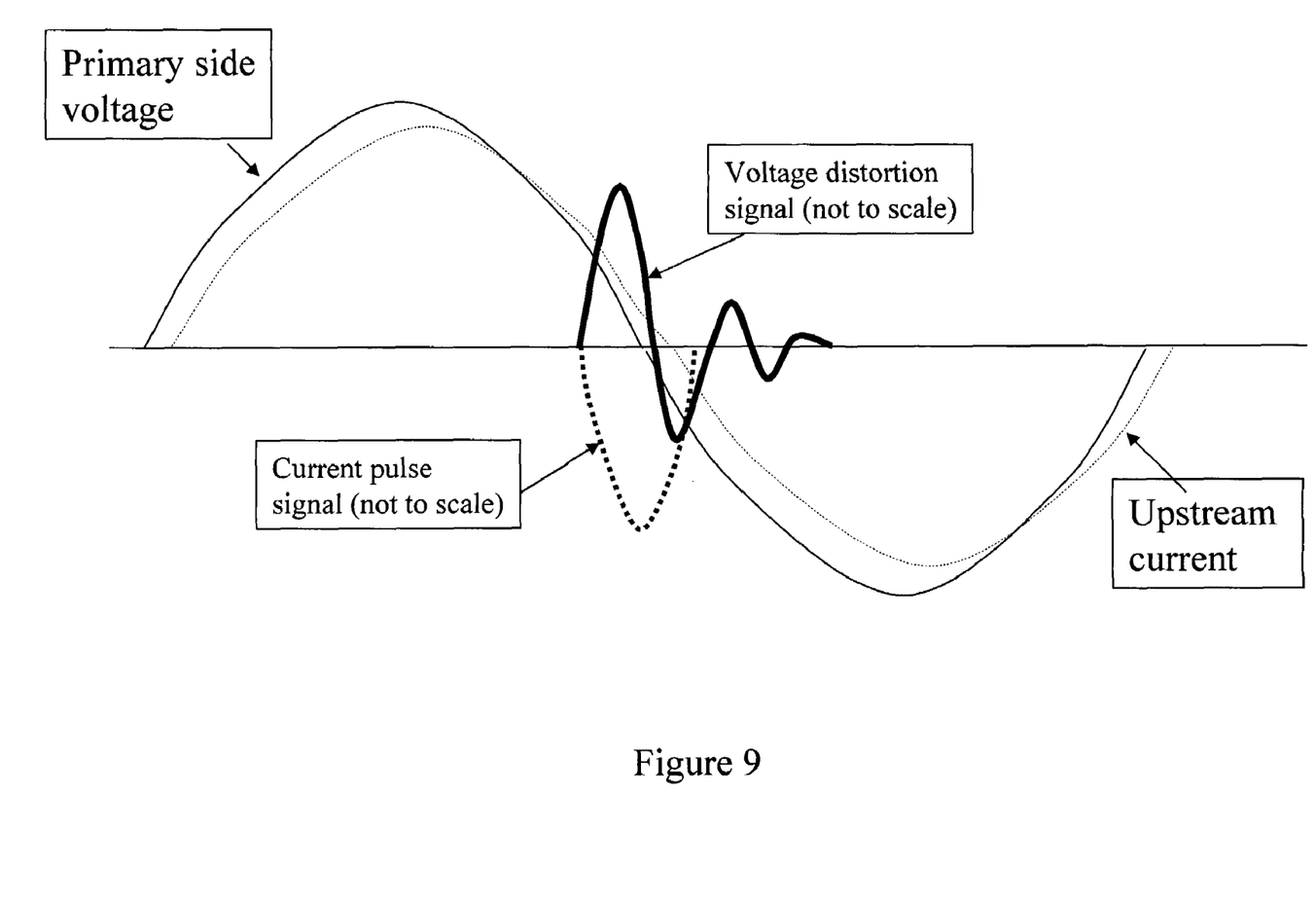
FIG. 9 shows a waveform incorporating a typical voltage signal and a current pulse produced by a signal generator for use in islanding detection with the present invention.
Figure 10:
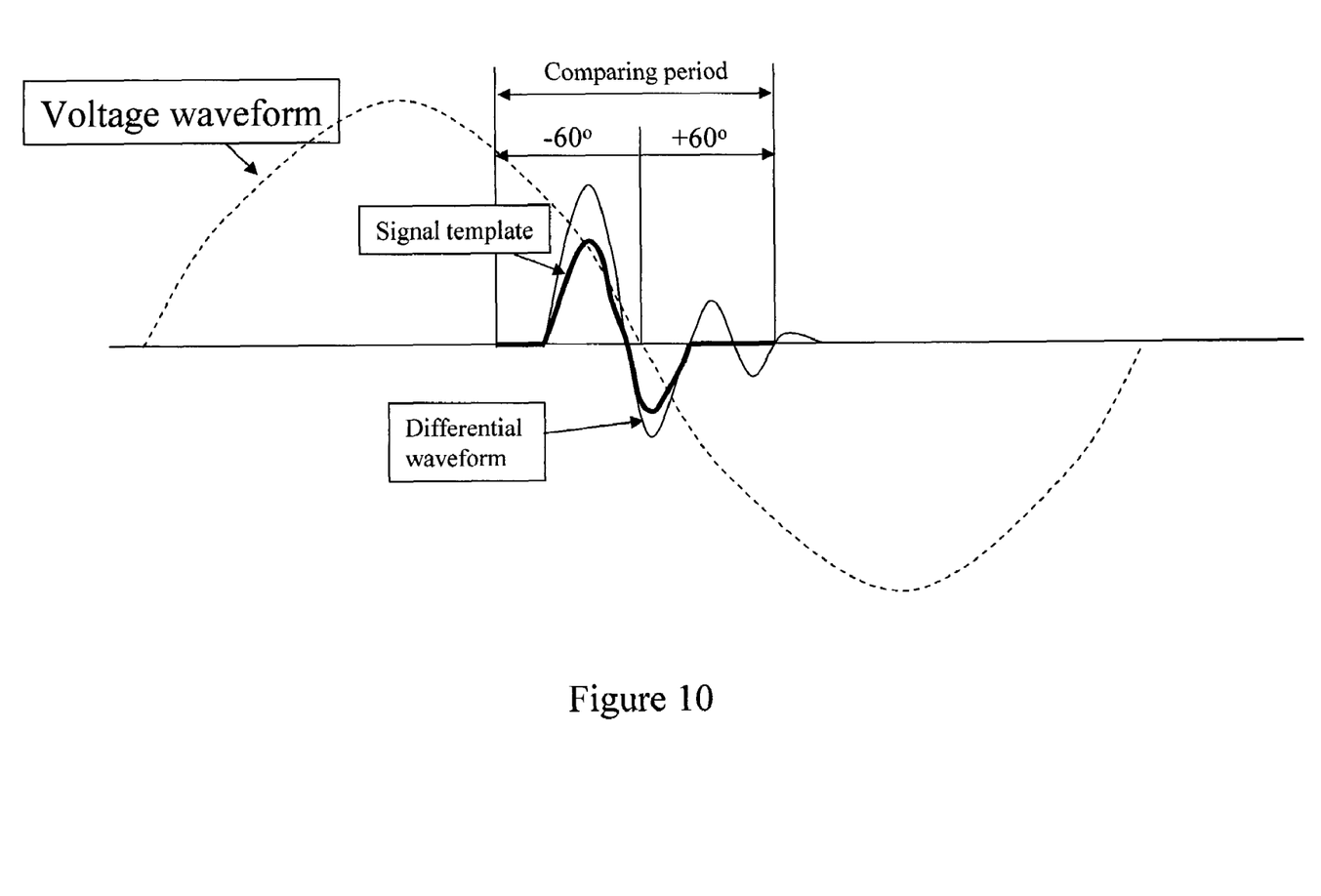
FIG. 10 is a schematic illustrating the preferred signal detection method of the present invention.

In the preferred embodiment the algorithm for signal detection is based on the principle of detecting the presence of the distortion signal. In the preferred embodiment, the distortion signal is obtained by digitally subtracting two consecutive cycles of the measured waveform since the signal is present at most in one of the cycles. The difference between an undistorted cycle and a distorted cycle is the distortion signal, which is shown in FIG. 10. Due to changes and disturbances in power systems, the result of subtraction between two consecutive cycles, called the differential signal, can be different from the ideal signal waveforms. One of the main goals of the signal detector is to determine if the differential signal indeed represents a genuine distortion signal. There are a number of ways to accomplish this task. One of the algorithms proposed for signal detection is summarized below (FIG. 9):

1) A signal template is stored in the detector. The template can be obtained by, for example, recording a 'good' signal during the normal operation of the power system;
2) The detector monitors the signal containing waveform continuously;
3) The waveform is subtracted by the data of the previous cycle. The result is the differential signal;
4) The 'distance' between the template and the differential waveform is calculated as follows (see FIG. 10). The calculation is performed, say, from +60° to −60° of the signal period.

$$D = \frac{\sum_{i=1,n} [x_{template}(i) - x(i)]^2}{\sum_{i=1,n} x_{template}(i)^2}$$

5) D is compared to a threshold. If D is greater than the threshold, a signal is considered as existent. Otherwise, the signal is considered non-existent.
6) If the signal does not exist continuously for a number of user specified cycles, the signal detector will send a trip signal to LG or SG.

Figure 11:
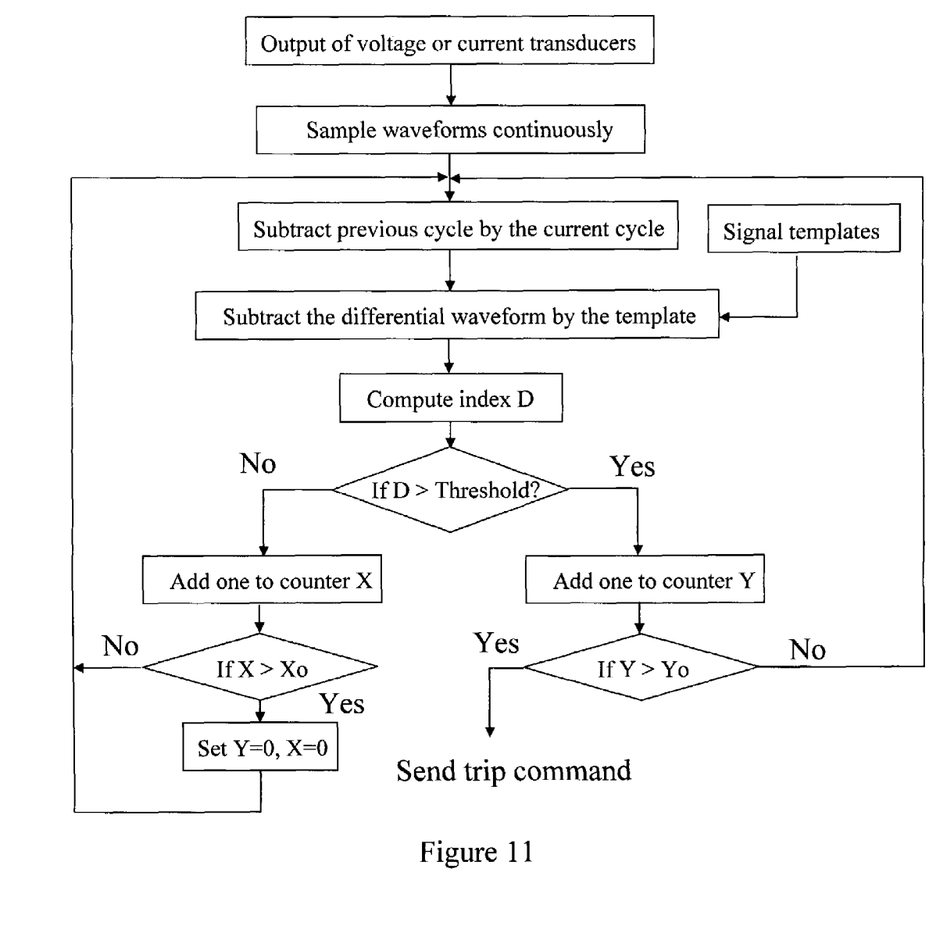
FIG. 11 is a flow diagram illustrating typical operation of the signal detector (SD).

A flowchart of the above signal detection process is shown in FIG. 11. In this figure X0 and Y0 are thresholds of counters. X counts how many signals are detected consecutively. If X is greater than X0 (for example, 2), the waveform will be considered as containing the signal. Y counts how many signals are missing consecutively. If Y is greater than Y0 (for example, 3), the waveform will be considered as containing no signal and actions will be taken to either stop the SG or trigger the opening of breaker D.

In summary, the present invention provides a reliable, flexible and economical method, system and apparatus for detecting a discontinuity in an electrical power distribution system. The invention is particularly suited for detecting islanding conditions in electrical power distribution systems.

Having described the invention, modifications will be evident to those skilled in the art without departing from the scope of the invention as defined in the appended claims.

I claim:

1. A signaling system for detecting power line discontinuity in a power distribution system having a main source of power, power lines and at least one feeder line, a local power generator in said feeder line, a signal generator in said power distribution system upstream of said local power generator relative to said main source of power, said signal generator providing a local generator control signal selected from the group consisting of a voltage signal and current signal with a preset protocol continuously, said signal generator having a thyristor module incorporating a thyristor means to create a short circuit and thereby provide said local generator control signal, a signal detector in said feeder line to detect said local generator control signal, said signal detector determining the presence of said local generator control signal and said signal detector including means to trigger the shutdown of said local generator when said local generator control signal is not detected by said signal detector for a predefined period of time.

2. A signaling system for detecting power line discontinuity in a power distribution system as described in claim 1 wherein said local generator control signal is a predefined signal and said signal detector determines if a detected signal it receives is said predefined signal and said signal detector triggers shut down of said local generator if said signal detector determines said detected signal is not said defined signal for said predefined period of time.

3. A signaling system for detecting power line discontinuity in a power distribution system as described in claim 2 wherein said local generator control signal is a voltage signal and said signal generator applies said voltage signal trough said power distribution system downstream of said signal generator relative to said main source of power.

4. A signaling system for detecting power line discontinuity in a power distribution system as described in claim 3 wherein said power detector means for terminating said application of said local generator control signal comprises a current detector to detect current in said power distribution system immediately upstream of said signal generator and to terminate operation of said signal generator to provide said local generator control signal when said current detector detects a significant change in current.

5. A signaling system for detecting power line discontinuity in a power distribution system as described in claim 3 wherein said signal generator is connected to a main supply line of said power supply system and said power detector means uses a significant drop in voltage to terminate operation of said signal generator.

6. A signaling system for detecting power line discontinuity in a power distribution system as described in claim 3 wherein said short circuit creates a change in current, a current detector to detect said change in current, a gating controller to control said thyristor module, said gating controller controlling said thyristor module and said current detector controlling said gating controller based on whether or not said current detector detects said change in current and said current detector functions as said power detector means for terminating said generation of said local generator control signal by said signal generator.

7. A signaling system for detecting power line discontinuity in a power distribution system as described in claim 2 wherein said power detector means for terminating said application of said local generator control signal comprises a current detector to detect current in said power distribution system immediately upstream of said signal generator and to terminate operation of said signal generator to provide said local generator control signal when said current detector detects a significant change in current.

8. A signaling system for detecting power line discontinuity in a power distribution system as described in claim 7 wherein said signal generator is connected to a main supply line of said power supply system and said power detector means uses a significant drop in voltage to terminate operation of said signal generator.

9. A signaling system for detecting power line discontinuity in a power distribution system as described in claim 2 wherein said signal generator is connected to a main supply line of said power supply system and said power detector means uses a significant drop in voltage to terminate operation of said signal generator.

10. A signaling system for detecting power line discontinuity in a power distribution system as described in claim 2 wherein said short circuit creates a change in current, a current detector to detect said change in current, a gating controller to control said thyristor module, said gating controller controlling said thyristor module and said current detector controlling said gating controller based on whether or not said current detector detects said change in current and said current detector functions as said power detector means for terminating said generation of said local generator control signal by said signal generator.

11. A signaling system for detecting power line discontinuity in a power distribution system as described in claim 1 wherein said local generator control signal is a voltage signal and said signal generator applies said voltage signal through said power distribution system downstream of said signal generator relative to said main source of power.

12. A signaling system for detecting power line discontinuity in a power distribution system as described in claim 11 wherein said power detector means for terminating said application of said local generator control signal comprises a current detector to detect current in said power distribution system immediately upstream of said signal generator and to terminate operation of said signal generator to provide said local generator control signal when said current detector detects a significant change in current.

13. A signaling system for detecting power line discontinuity in a power distribution system as described in claim 11 wherein said signal generator is connected to a main supply line of said power supply system and said power detector means uses a significant drop in voltage to terminate operation of said signal generator.

14. A signaling system for detecting power line discontinuity in a power distribution system as described in claim 11 wherein said short circuit creates a change in current, a current detector to detect said change in current, a gating controller to control said thyristor module, said gating controller controlling said thyristor module and said current detector controlling said gating controller based on whether or not said current detector detects said change in current and said current detector functions as said power detector means for terminating said generation of said local generator control signal by said signal generator.

15. A signaling system for detecting power line discontinuity in a power distribution system as described in claim 1 wherein said power detector means for terminating said application of said local generator control signal comprises a current detector to detect current in said power distribution system immediately upstream of said signal generator and to terminate operation of said signal generator to provide said local generator control signal when said current detector detects a significant change in current.

16. A signaling system for detecting power line discontinuity in a power distribution system as described in claim 15 wherein said signal generator is connected to a main supply line of said power supply system and said power detector means uses a significant drop in voltage to terminate operation of said signal generator.

17. A signaling system for detecting power line discontinuity in a power distribution system as described in claim 15 wherein said short circuit creates a change in current, a gating controller to control said thyristor module, said gating controller controlling said thyristot module and said current detector controlling said gating controller based on whether or not said current detector detects said change in current.

18. A signaling system for detecting power line discontinuity in a power distribution system as described in claim 1 wherein said signal generator is positioned in said power distribution system immediately upstream of said local generator and generates a current signal that provides a continuous signal pattern that is detected by said signal detector and said signal detector is a current signal detector.

19. A signaling system for detecting power line discontinuity in a power distribution system as described in claim 1 wherein said signal generator is connected to a main supply line of said power supply system and said power detector means uses a significant drop in voltage to terminate operation of said signal generator.

20. A signaling system for detecting power line discontinuity in a power distribution system as described in claim 1 wherein said short circuit causes a change in current, a current detector to detect said change in current, a gating controller to control said thyristor module, said gating controller controlling said thyristor module and said current detector controlling said gating controller based on whether or not said current detector detects said change in current and said current detector functions as said power detector means for terminating said generation of said local generator control signal by said signal generator.

* * * * *